(12) United States Patent
Peng et al.

(10) Patent No.: US 7,817,413 B2
(45) Date of Patent: Oct. 19, 2010

(54) MOUNTING APPARATUS FOR DATA STORAGE DEVICE

(75) Inventors: Wen-Tang Peng, Taipei Hsien (TW); Guang-Yi Zhang, Shenzhen (CN); Zhe Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 160 days.

(21) Appl. No.: 12/200,854

(22) Filed: Aug. 28, 2008

(65) Prior Publication Data

US 2009/0296338 A1     Dec. 3, 2009

(30) Foreign Application Priority Data

May 30, 2008   (CN) .................... 2008 1 0301849

(51) Int. Cl.
  *H05K 5/00*   (2006.01)
  *H05K 7/00*   (2006.01)
(52) U.S. Cl. .................... 361/679.33; 361/679.35; 361/679.36
(58) Field of Classification Search ............ 361/679.33, 361/679.35, 679.36
See application file for complete search history.

(56) References Cited

U.S. PATENT DOCUMENTS

| 5,588,728 A * | 12/1996 | Eldridge et al. .......... 312/332.1 |
| 7,155,730 B2 * | 12/2006 | Hsu et al. .................... 720/600 |
| 7,593,221 B2 * | 9/2009 | Sheng .................... 361/679.35 |

FOREIGN PATENT DOCUMENTS

CN    201035483 Y    3/2008

* cited by examiner

Primary Examiner—Jayprakash N Gandhi
Assistant Examiner—Anthony M Haughton
(74) Attorney, Agent, or Firm—Zhigang Ma

(57) ABSTRACT

A mounting apparatus for mounting a data storage device, the mounting apparatus includes a bracket and a holder. The bracket includes a bottom plate, and a first side plate extending from one side of the bottom plate. A protrusion protrudes from the bottom plate. A blocking member is formed from the side plate. The holder includes a first sidewall configured for mounting the data storage device thereto, and a latching plate extending from the first sidewall. An engaging portion is formed from the sidewall and capably of engaging with the blocking member of the side plate of the bracket. A latch portion is formed from the latching plate and capably of sliding over to engage with the protrusion of the bottom plate of the bracket.

17 Claims, 5 Drawing Sheets

MOUNTING APPARATUS FOR DATA STORAGE DEVICE

BACKGROUND

1. Field of the Invention

The present invention relates to mounting apparatuses, and more particularly to a mounting apparatus which readily allows securely installing or removing a data storage device to or from an electronic device.

2. Description of Related Art

An electronic apparatus, such as a computer, or a server, usually includes data storage devices, such as hard disk drives, compact disk read-only memory (CD-ROM) drives, digital video disc (DVD) drives, and floppy disk drives. These devices are typically added to increase the functionality of the electronic apparatus. However, installation of such devices in the electronic apparatus is usually labor-intensive.

The installation of a hard disk drive in a computer typically involves using screws to attach the hard disk drive to a bracket on a chassis of the computer. Usually, these screws are so small that it is difficult to install them. Guiding and mounting the screws into the intended location is not easy, and time consuming. Additionally, because of their small size, the screws tend to drop before they are aligned at the intended location. This may cause damages to the circuitry of the computer.

To address the aforementioned problems, a plurality of mounting apparatuses have been invented to reduce the number of needed screws. For example, a pair of detachable rails is attached to opposite sides of a data storage device with screws. The data storage device is slid into, and secured to, a drive bracket. However, the screws have to be removed to detach the rails from the data storage device when replacing the data storage device.

What is desired, therefore, is a mounting apparatus which conveniently and securely holds a data storage device in a bracket.

DETAILED DESCRIPTION

Figure 1:
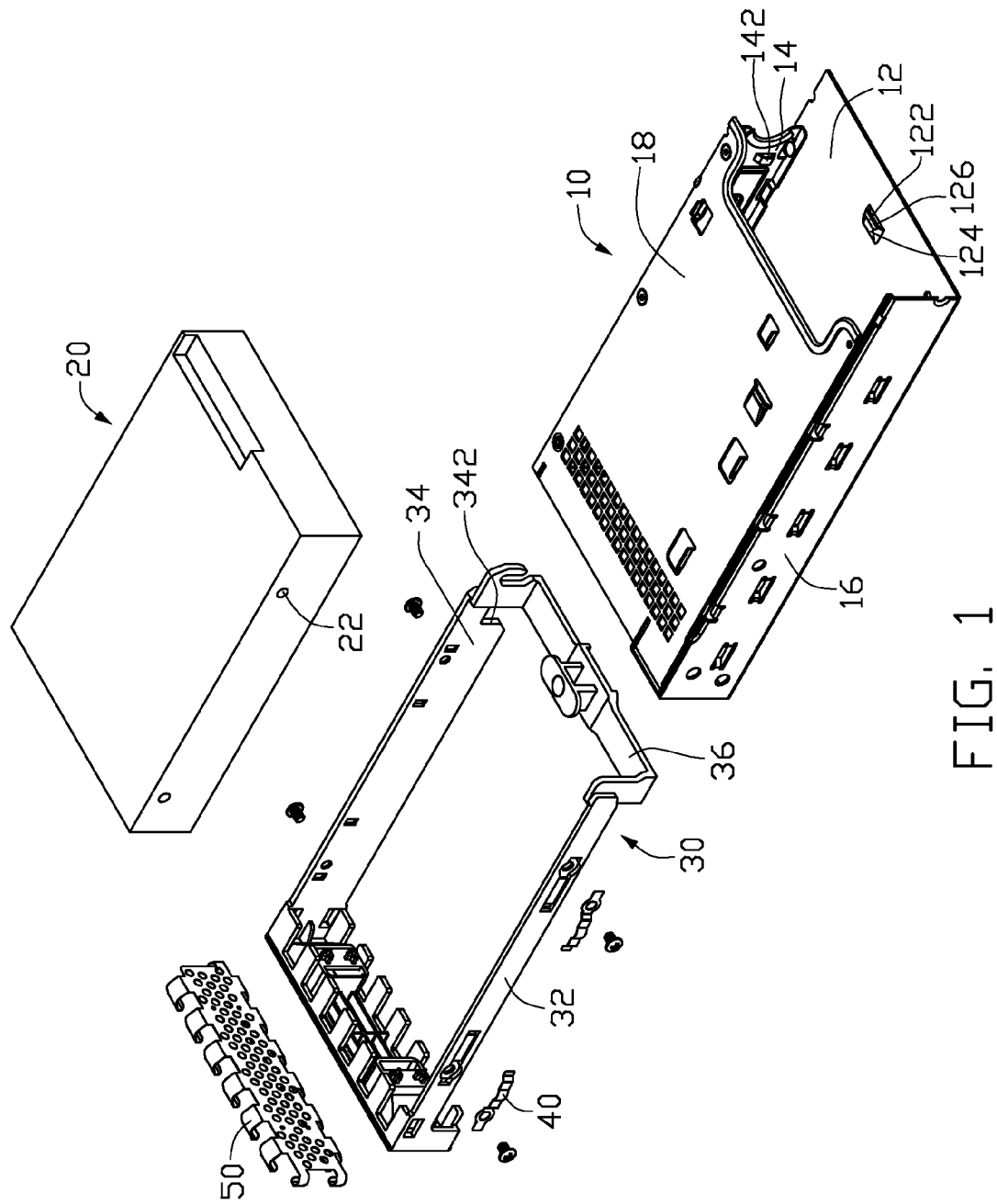
FIG. 1 is an exploded, isometric view of a mounting apparatus for data storage device according to a first embodiment of the present invention, together with a data storage device, the mounting apparatus includes a holder and a bracket.

Referring to FIG. 1, in an embodiment of the present invention, a mounting apparatus for mounting a data storage device 20 is provided. The data storage device 20 defines a plurality of mounting holes 22 in opposite sides thereof. The mounting apparatus includes a bracket 10 and a holder 30.

The bracket 10 is generally box-shaped with two openings defined in opposite ends thereof. The bracket 10 includes a bottom plate 12, a first side plate 14 and a second side plate 16 extending from opposite sides of the bottom plate 12, and a top plate 18 parallel to the bottom plate 12 and connecting a top portion of the first side plate 14 to a top portion of the second side plate 16. A protrusion 122 extends toward the top plate 18 from an end of the bottom plate 12. The protrusion 122 includes an inclined surface 124 and a blocking portion 126. A blocking member 142 extends toward the second side plate 16 from the first side plate 14.

Figure 2:
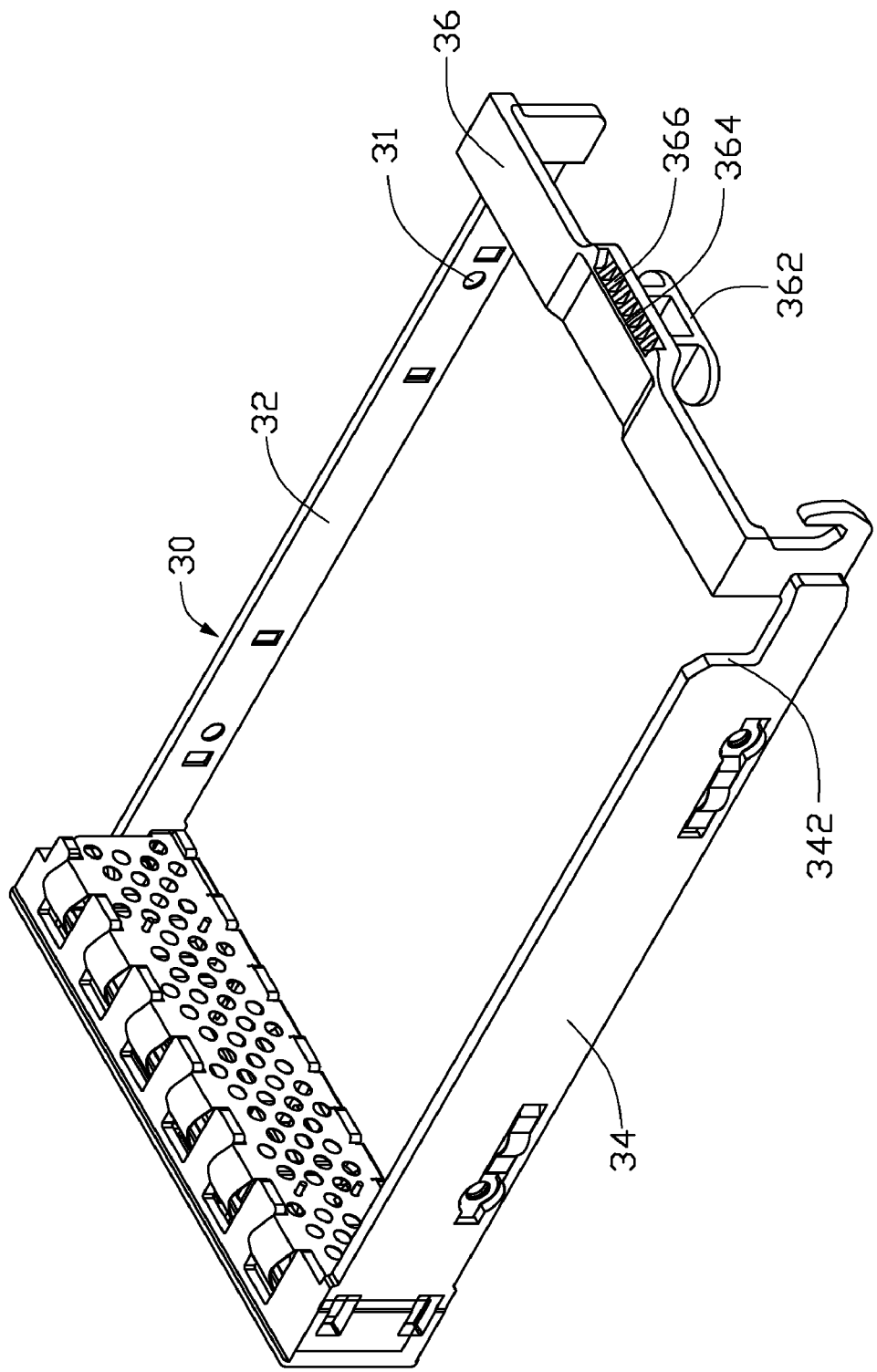
FIG. 2 is an assembled, enlarged view of the holder of FIG. 1.

Referring also to FIG. 2, the holder 30 is generally a frame. The holder 30 includes two opposite sidewalls 32, 34, a latching plate 36 arranged between one end of the sidewall 32 and one end of the sidewall 34. A plurality of through holes 31 are defined in the sidewalls 32, 34 corresponding to the mounting holes 22 of the data storage device 20. A cutout is defined in a lower portion of the sidewall 34 adjacent to the latching plate 36. An engaging portion 342 is formed at a sidewall of the cutout. A π-shaped handle 362 is formed from a middle portion of the latching plate 36. A latching portion 364 is formed from the middle portion of the latching plate 36, opposite to the handle 362. A plurality of ribs 366 are formed from the latching portion 364. Each of the ribs 366 has an inclined surface. A plurality of metal resilient members 40 is attached to the sidewalls 32, 34 for grounding and absorbing shock. A metal shield 50 is arranged on the holder 30 opposite to the latching plate 36 for shielding electro magnetic interference (EMI) shielding.

Figure 3:
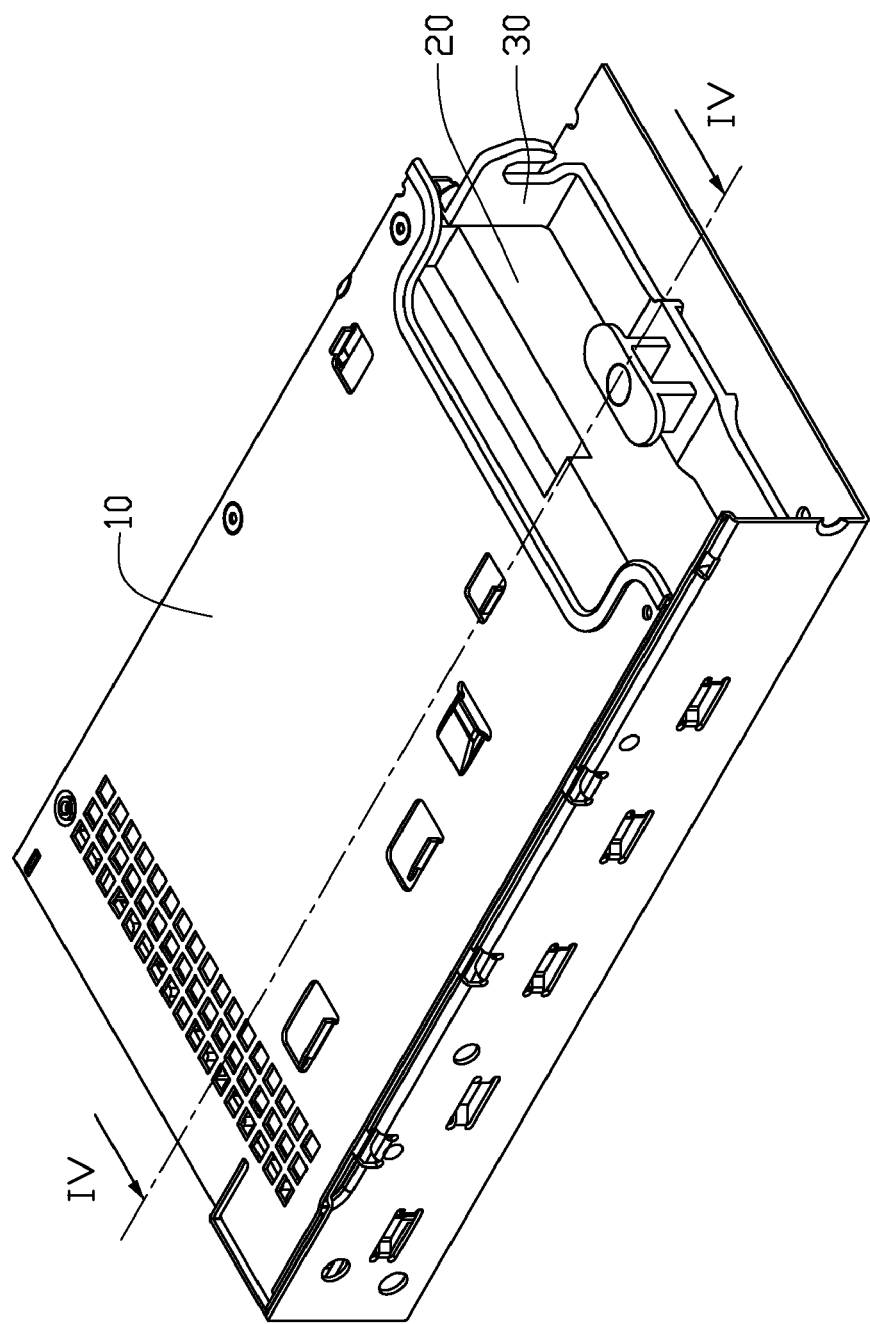
FIG. 3 is an assembled view of the mounting apparatus of FIG. 1, showing a first using state of the mounting apparatus.
Figure 4:
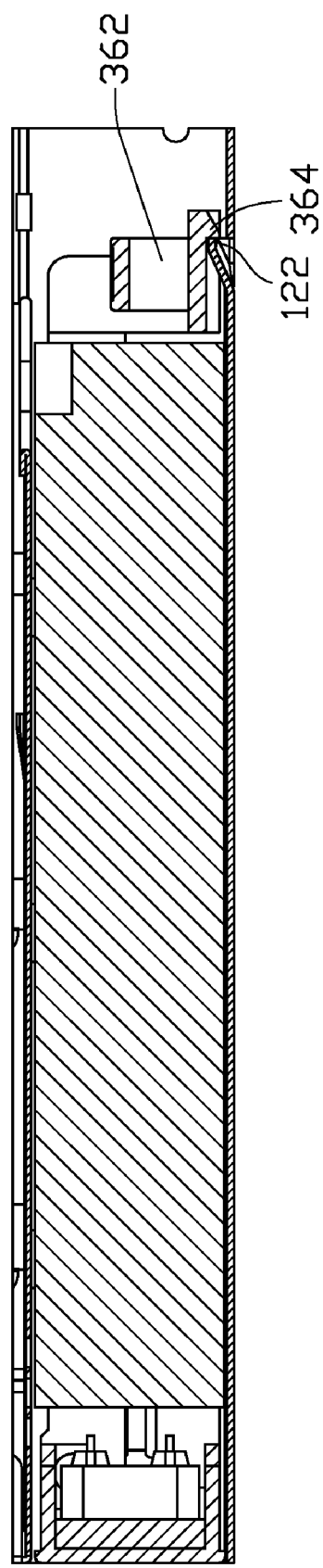
FIG. 4 is a cross-sectional view of FIG. 3, taken along the line IV-IV in FIG. 3.

Referring also to FIGS. 3 and 4, in assembly, the data storage device 20 is fixed to the holder 30 via a plurality of bolts inserted through the through holes 31 of the sidewalls 32, 34 and engaged in the mounting holes 22 of the data storage device 20 correspondingly. The holder 30 holding the data storage device 20 is inserted into the bracket 10 from the opening opposite to end of the bracket 10 adjacent to the protrusion 122 so as to be accommodated in the bracket 10. The holder 30 is slid into the bracket 10 until the latching portion 364 of the holder 30 slides over the inclined surface 124 of the protrusion 122 to engage with the blocking portion 124 of the protrusion 122, thus preventing the holder 30 from sliding out of the bracket 10 from the inserting opening. Furthermore the engaging portion 342 of the sidewall 34 of the holder 30 is blocked by and engaged with the blocking member 142 of the bracket 10 to keep the holder 30 from sliding out of the bracket 10 through both of the openings. The ribs 366 are used for reinforcing the latching portion 364. The inclined surfaces of the ribs 366 are used for guiding the latching portion 364 to ride over the protrusion 122. In the embodiment of the invention, the holder is made of plastic. The bracket 10 is made of metal. The resilient members 40 and bolts are arranged between the holder 30 and the bracket 10 for grounding the data storage device 20.

Figure 5:
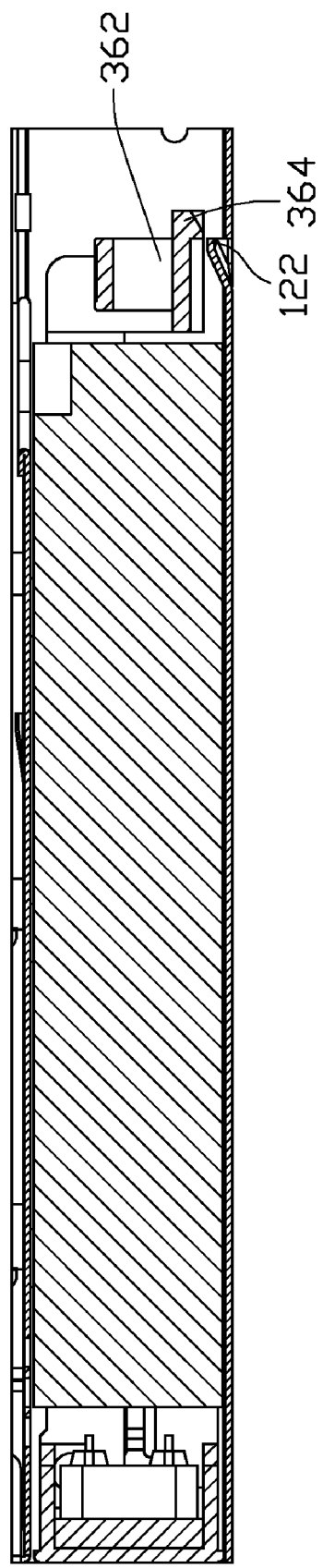
FIG. 5 is similar to FIG. 4, but showing a second using state of the mounting apparatus.

Referring to FIG. 5, to release the holder 30 from the bracket 10, the handle 362 of the holder 30 is pulled up, the latching plate 36 deforms and displaces the latching portion 364, thus disengaging from the protrusion 122 of the bracket 10. As a result, the holder 30 can then be pushed out of the bracket 10 by overcoming the engagement of blocking member 142 of the bracket 10 and the engaging portion 342 of the holder 30. The data storage device 20 integrates with the holder 30 for easily assembling or removing from the bracket 10.

It is also to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus for mounting a data storage device, the mounting apparatus comprising:
a bracket with a first opening and a second opening defined in opposite ends of the bracket, the bracket comprising:
a bottom plate defining a protrusion protruding from the bottom plate near the second opening; and
a first side plate extending from one side of the bottom plate, a blocking member formed from the side plate; and
a holder comprising:
a first sidewall configured for mounting the data storage device thereto, an engaging portion formed from the first sidewall and capably of engaging with the blocking member of the side plate of the bracket; and
a latching plate extending from the sidewall, a latch portion formed from the latching plate and capably of sliding over to engage with the protrusion of the bottom plate of the bracket
wherein the holder is slid into the bracket from the first opening of the bracket until the latching portion of the holder slides over the protrusion from one side of the protrusion facing the first opening to engage with another side of the protrusion facing the second opening, thus preventing the holder from sliding out of the bracket from the first opening, and the engaging portion of the sidewall of the holder is blocked by and engaged with the blocking member of the bracket to keep the holder from sliding out of the bracket from the second opening.

2. The mounting apparatus as described in claim 1, wherein the bracket is generally box-shaped the bracket further comprises a second side plate extending from the other side of the bottom plate, and a top plate parallel to the bottom plate and connecting top portions of the side plates.

3. The mounting apparatus as described in claim 2, wherein the protrusion extends toward the top plate from one end of the bottom plate.

4. The mounting apparatus as described in claim 3, wherein the protrusion comprises an inclined surface and a blocking portion, the latching portion of the holder is capably of sliding over the inclined surface of the protrusion to engage with the blocking portion of the protrusion.

5. The mounting apparatus as described in claim 3, wherein the blocking member extends toward the second side plate from one end of the first side plate, adjacent to the protrusion of the bottom plate.

6. The mounting apparatus as described in claim 1, wherein the holder is generally a frame, and further comprises a second sidewall parallel and opposite to the first sidewall, the latching plate arranged between ends of the sidewalls.

7. The mounting apparatus as described in claim 6, wherein a plurality of through holes are defined in the first and second sidewalls of the holder for mounting the data storage device by fixing opposite sides of the data storage device thereto.

8. The mounting apparatus as described in claim 6, wherein a cutout is defined in a lower portion of the first sidewall adjacent to the latching plate, the engaging portion is formed at a sidewall of the cutout.

9. The mounting apparatus as described in claim 6, wherein the latching portion is formed from a middle portion of the latching plate.

10. The mounting apparatus as described in claim 9, wherein the latching plate further comprises a handle formed from the middle portion, opposing to the latching portion, the handle is capably of being pulled to make the latching plate to disengage the latching portion from the protrusion of the bracket.

11. The mounting apparatus as described in claim 9, wherein a plurality of ribs are formed from the latching portion for reinforcing the latching portion, each of the ribs has an inclined surface, the inclined surfaces of the ribs are capably of leading the latching portion to slide over the protrusion.

12. The mounting apparatus as described in claim 1, wherein a plurality of metal resilient members is attached to the first sidewall of the holder for grounding and shock absorption of the data storage device.

13. The mounting apparatus as described in claim 1, wherein a metal shield is arranged on the holder, opposing to the latching plate for electro magnetic interference shielding.

14. The mounting apparatus as described in claim 1, wherein the latching plate is integrally formed from the sidewall, and the latch portion is integrally formed from the latching plate.

15. An electronic device, comprising:
a data storage device;
a bracket with a first opening and a second opening defined in opposite ends of the bracket, comprising:
a bottom plate defining a protrusion protruding from the bottom plate nearer to the second opening than to the first opening; and
two side plates extending from opposite sides of the bottom plate respectively, a blocking member formed from one of the side plates; and
a holder comprising:
two sidewalls configured for mounting the data storage device therebetween, an engaging portion formed from one of the sidewalls and capably of engaging with the blocking member of the bracket; and
a latching plate arranged between the sidewalls, a latch portion formed from the latching plate and capably of sliding over to engage with the protrusion of the bottom plate of the bracket;
wherein the holder is slid into the bracket from the first opening of the bracket until the latching portion of the holder slides over the protrusion from one side of the protrusion facing the first opening to engage with another side of the protrusion facing the second opening, thus preventing the holder from sliding out of the bracket from the first opening, the engaging portion of the sidewall of the holder is blocked by and engaged with the blocking member of the bracket to keep the holder from sliding out of the bracket from the second opening.

16. The mounting apparatus as described in claim 15, wherein the latching plate is integrally formed from the sidewall, and the latch portion is integrally formed from the latching plate.

17. A mounting apparatus for mounting a data storage device, the mounting apparatus comprising:
a bracket comprising:
a bottom plate defining a protrusion protruding from the bottom plate; and
a first side plate extending from one side of the bottom plate, a blocking member formed from the side plate; and
a holder comprising:
a first sidewall configured for mounting the data storage device thereto, an engaging portion formed from the first sidewall and capably of engaging with the blocking member of the side plate of the bracket; and
a latching plate extending from the sidewall, a latch portion formed from the latching plate and capably of sliding over to engage with the protrusion of the bottom plate of the bracket;

wherein the holder is generally a frame, and further comprises a second sidewall parallel and opposite to the first sidewall, the latching plate arranged between ends of the sidewalls;

wherein the latching portion is formed from a middle portion of the latching plate;

wherein a plurality of ribs are formed from the latching portion for reinforcing the latching portion, each of the ribs has an inclined surface, the inclined surfaces of the ribs are capably of leading the latching portion to slide over the protrusion.

* * * * *